2,755,211
Patented July 17, 1956

2,755,211
ELECTRIC WELDING MEDIUM CONTAINING MANGANESE OXIDE, TITANIA, AND SILICA

Clarence E. Jackson and Arthur E. Shrubsall, Niagara Falls, N. Y., assignors to Union Carbide and Carbon Corporation, a corporation of New York No Drawing. Application December 17, 1954, Serial No. 476,055

2 Claims. (Cl. 148—26)

This invention relates to that type of electric welding process in which metal is deposited from a bare welding electrode while the welding zone is covered with a deep layer of a granulated "welding medium"; it is directly concerned with a novel welding medium which makes possible the welding of light gage sheet metal at high rates of speed.

The welding process referred to was originally developed for the welding of heavy sections and has found its greatest utility in the production of welds in plate ranging in thickness from about ¼ inch to 4 inches. The sound, strong welds made automatically and quickly by this welding process have made it attractive for ever-widening fields of application. Much time and effort have been expended in an endeavor to adapt the process for use in automatic high speed welding of thin sheet metal. While good welds have been made with conventional welding media in such thin sheet at rates up to about 150 inches per minute, the demand for higher and higher production rates has led to a continuing demand for a medium which would permit welding such material at higher rates of speed than have been heretofore possible.

It is the principal object of this invention to provide a welding medium which makes possible the attainment of high welding speeds in light gage sheet metal.

This object is attained by the invention which comprises a granulated electric welding medium containing as essential constituents manganese oxide, titania, and silica and which may also contain, and preferably does, small quantities of alumina and vanadium oxide. Oxides of iron (FeO), calcium (CaO) and magnesium (MgO) are also generally present. More specifically, the welding medium of the invention contains 15% to 28% silica; 20% to 35% titania; up to 7.5% alumina; up to about 7.5% total of iron oxide (FeO), lime (CaO) and magnesia (MgO), iron oxide and lime preferably not exceeding about 3% each in the presence of each other, and magnesia generally not exceeding 2%; up to 1% vanadium pentoxide; up to 5% calcium fluoride; the remainder manganese oxide, the manganese oxide content being 40% to 50%. A preferred range of composition is: 17% to 20% silica; 20% to 24% titania; 2% to 3% calcium fluoride; 3.5% to 5.5% alumina; 0.3% to 0.7% vanadium pentoxide; up to 3% iron oxide (FeO); up to 1% lime; up to 1% magnesia; the remainder, manganese oxide, the manganese oxide content being 44% to 48%. It is particularly pointed out that the composition is not predominantly a silicate as are conventional media and that the silica content must be within the ranges defined herein to achieve the desired results.

The welding medium of the invention is preferably pre-fused and is prepared in conventional manner as by fusing raw materials such as silica, rutile and manganese ores. The molten mixture is then cast onto chills for solidification. The solidified mass is crushed to size, for instance to "12 x 200," that is, so that all will pass a 12-mesh screen (1.397 mm. openings) and will be retained on a 200-mesh screen (.074 mm. openings) and is ready for use.

In the following table, a number of specific examples of particular compositions embodying the invention are set forth. All of the tabulated compositions have been found to be uniformly satisfactory for welding light gage sheet metal at speeds as high as 200 inches per minute.

*Percent composition—by weight*

| $SiO_2$ | $TiO_2$ | MnO | FeO | CaO | MgO | $Al_2O_3$ | $CaF_2$ | $V_2O_5$ |
|---|---|---|---|---|---|---|---|---|
| 17.14 | 29.00 | 43.17 | 3.15 | 2.71 | 0.37 | 4.24 | N. D. | N. D. |
| 22.50 | 21.42 | 44.20 | 2.25 | 2.98 | 0.16 | 2.42 | N. D. | N. D. |
| 27.60 | 20.13 | 40.84 | 1.98 | 1.85 | 2.05 | 6.06 | N. D. | N. D. |
| 19.00 | 21.42 | 45.64 | 4.38 | N. D. | N. D. | 5.40 | 2.52 | 0.63 |
| 19.18 | 22.16 | 46.09 | 1.94 | N. D. | N. D. | 4.94 | 1.98 | 0.63 |
| 22.66 | 17.74 | 42.42 | 3.45 | 2.49 | 1.20 | 5.40 | 2.62 | 0.56 |
| 20.00 | 20.53 | 46.04 | 1.93 | 1.49 | 1.04 | 4.58 | 2.30 | 0.71 |

N. D.=not determined.

As indicated above, the welding medium of the invention has proved to be satisfactory in all respects when used in producing welds in light gage sheet metal at high speeds. For example, each of the tabulated compositions was used in making welds at speeds of 100, 150, and 200 inches per minute in a series of tests. In each case, square edged butt welds were made in S. A. E. 1010 14-gage steel sheet. At a welding speed of 100 inches per minute, the welding current used was 325 amperes, the voltage 21 volts. At 15 inches per minute, welding current was 400 amperes, voltage 22, and at 200 inches per minute, the welding current was 490 amperes, the voltage 22 volts. In each case, direct current was employed with reverse polarity. In each case, and at every speed, sound welds were produced with complete penetration. The welds were substantially free of undercutting, pock marks, blowholes, cracks or other imperfections normally encountered with the use of former welding media at such high welding speeds. The weld deposit was about ⅛ inch wide in each case using a 3/32 inch diameter steel welding electrode containing about 1% manganese, 0.15% carbon, and 0.2% silicon.

The welding medium of the invention has also been proved useful in welding plate up to one inch thick in a single pass, single-pass welds in one inch plate being produced at a speed of about 11 inches per minute under appropriate welding conditions.

Among the advantages of the composition of the invention, is the fact that it may be used on dirty, oily, or rusty sheet metal without producing inferior welds.

What is claimed is:

1. A granulated welding medium containing 15% to 28% silica; 20% to 35% titania; up to 7.5% alumina; up to about 7.5% in the aggregate of at least one oxide selected from the group consisting of iron oxide (FeO), lime (CaO) and magnesia (MgO); up to 1% vanadium pentoxide; up to 5% calcium fluoride; the remainder manganese oxide (MnO) and incidental impurities, the composition of the medium being so balanced that the manganese oxide content is 40% to 50%.

2. A granulated welding medium containing 17% to 20% silica; 20% to 24% titania; 2% to 3% calcium fluoride; 3.5% to 5.5% alumina; 0.3% to 0.7% vanadium pentoxide; up to 3% iron oxide (FeO); up to 1% lime; up to 1% magnesia; the remainder manganese oxide and incidental impurities, the composition of the medium being so balanced that the manganese oxide content is 44% to 48%.

References Cited in the file of this patent
UNITED STATES PATENTS

| 2,308,194 | Miller | Jan. 12, 1943 |
| 2,509,654 | Smith | May 30, 1950 |

OTHER REFERENCES

Outline of Practice Relating to "Markush" claims. Revised May 1, 1951, prepared by M. C. Rosa, page 7.